US008730154B2

(12) United States Patent
Dean et al.

(10) Patent No.: US 8,730,154 B2
(45) Date of Patent: May 20, 2014

(54) DISPLAY APPARATUS

(75) Inventors: Kenneth A. Dean, Phoenix, AZ (US); Jason C. Heikenfeld, Cincinnati, OH (US)

(73) Assignee: Gamma Dynamics LLC, Cincinnati, NY (US)

( * ) Notice: Subject to any disclaimer, the term of this patent is extended or adjusted under 35 U.S.C. 154(b) by 94 days.

(21) Appl. No.: 13/567,976

(22) Filed: Aug. 6, 2012

(65) Prior Publication Data

US 2013/0033476 A1 Feb. 7, 2013

Related U.S. Application Data

(60) Provisional application No. 61/574,516, filed on Aug. 4, 2011.

(51) Int. Cl.
*G09G 3/34* (2006.01)
*G02B 26/00* (2006.01)

(52) U.S. Cl.
USPC ........... 345/107; 345/204; 345/690; 359/290; 359/296

(58) Field of Classification Search
USPC ............... 345/48–50, 87, 105, 107, 204, 690, 345/208–211; 359/290, 296, 665
See application file for complete search history.

(56) References Cited

U.S. PATENT DOCUMENTS 3,389,296 A 6/1968 Carruth
3,775,353 A 11/1973 Kohne, Jr. et al.
8,279,166 B2 * 10/2012 Huitema et al. .............. 345/107
8,508,468 B2 * 8/2013 Huitema ....................... 345/107
2005/0136243 A1 6/2005 Fisher
2009/0002822 A1 1/2009 Tonar et al.
2009/0225400 A1 9/2009 Ansems et al.
2009/0296188 A1 12/2009 Jain et al.
2010/0208328 A1 * 8/2010 Heikenfeld et al. .......... 359/290
2012/0170101 A1 * 7/2012 Ku et al. ....................... 359/290
2013/0128336 A1 * 5/2013 Dean et al. .................... 359/290

FOREIGN PATENT DOCUMENTS

WO WO 2009/036272 A1 3/2009
WO PCT/US11/00595 7/2011
WO WO 2011/126554 A1 10/2011
WO PCT/US11/00595 3/2012

* cited by examiner

*Primary Examiner* — Hong Zhou
(74) *Attorney, Agent, or Firm* — Porter Wright Morris & Arthur LLP; Ryan Willis

(57) ABSTRACT

A device, an electrode configuration and a sequence for activating those electrodes for the purpose of switching device states quickly with minimum flicker during bi-stable image reset. The disclosure addresses the constraints of electrofluidic technology: 1) the polar fluid can be attracted to a position with voltage, but it cannot be repelled, and 2) because the polar fluid translates, changing its area against an electrode and thereby changing the capacitance, the time to discharge the capacitor formed by area contact with a polar fluid is significantly smaller than the time to charge a capacitor, which requires translation of the fluid. Setting the grayscale is based on discharging, not charging, when possible. In addition, the use of pixel-level partial reset states reduces the appearance of flicker further by minimizing the change in pixel state during data write/update.

21 Claims, 7 Drawing Sheets

DISPLAY APPARATUS

CROSS REFERENCE TO RELATED APPLICATIONS

The present application claims the benefit of U.S. Provisional Patent Application Ser. No. 61/574,516, filed on Aug. 4, 2011 and titled, "DRIVE SCHEMES FOR MULTI-STABLE AND BI-STABLE DEVICES, the disclosure of which is hereby incorporated by reference.

FEDERALLY SPONSORED RESEARCH OR DEVELOPMENT

This invention was made with United States Government support from the National Science Foundation, Grant No. 0944455. The Government may have certain rights in the invention.

RELATED ART

1. Field of the Invention

The present disclosure relates to electrofluidic devices that provide an optical response for the purpose of altering surface reflectivity, transmission through a surface, or creating 2D or 3D images for informational display.

2. Brief Discussion of Related Art

Electrowetting has been a highly attractive modulation scheme for a variety of optical applications. For example, electrowetting has been used to provide optical switches for fiber optics, optical shutters or filters for cameras and guidance systems, optical pickup devices, optical waveguide materials, and video display pixels.

Conventional electrowetting displays include a colored oil that forms a film layer against an electrically insulating fluoropolymer surface. Underneath the fluoropolymer is a reflective electrode constructed from aluminum. This colored oil film layer provides coloration to the reflective surface below. When a voltage is applied between a water layer residing above the oil film layer and the electrode below the fluoropolymer, the oil film layer is broken up as the water electrowets the fluoropolymer. When the voltage is removed, the oil returns to the film layer geometry. While the oil film layer is broken up, the perceived coloration of the surface is that of the reflective electrode (white) whereas, when the oil is in the film state, the perceived coloration is that of the oil. Coloration of the oil is provided by including at least one dye. Conventional electrowetting technology can provide greater than 70% white state and a contrast ratio of up to 10:1. A newer form of electrofluidic display, published by Heikenfeld in the May 1, 2009 issue of Nature Photonics, improves upon this optical performance.

However, conventional electrowetting technology is not bi-stable or multi-stable as are electrophoretic, cholesteric, and electrochromic technologies. Of these, electrophoretic technology is currently enjoying remarkable success in the marketplace as ebook reader displays. However, each of the hi-stable displays is slow to switch, due to the physics of the mechanisms that create their bistability. In addition, the drive schemes for these related art technologies, particularly electrophoretic and cholesteric, require a reset frame to switch the pixel back to a known state prior to addressing a new state. The reset frame leads to a perceivable 'flicker' of the screen on update. In fact, some devices require several flickers to clear the screen. The long reset frame, in combination with the slow switching time preclude display from switching quickly enough to browse web pages or show video content when needed.

In addition, the related art bi-stable displays, as well as bi-stable MEMS-based interference displays are limited in their color rendition capabilities, due their low overall white state reflectance (<40%) and/or a poor black state (>5%). When combined with a traditional color filter approach such as RGBW, these devices are incapable of obtaining good color saturation.

In a previous patent application WO2011020020 and publication [S. Yang, K. Zhou, E. Kreit, and J. Heikenfeld, "High reflectivity electrofluidic pixels with zero-power grayscale operation", APPLIED PHYSICS LETTERS 97, 143501 (2010)], a new bi-stable electrofluidic display was described which uses a neutral Young-Laplace pressure to create bi-stable and multi-stable pixel states. The device structure contains two channels (upper and lower), each of which stores fluids, as well as a diffuse, reflective surface on the bottom of the upper channel. In the 'white' viewed state, the reflective surface is exposed and viewed through a thin layer of transparent non-polar fluid, leading to a reflectivity of nominally 55% to 80%. In the dark viewed state, the black polar fluid is pulled into the top channel, blocking the reflective surface from view. The dark fluid, comprised of a polar liquid and black pigment, is optically dense enough to attenuate >99% of incident light, leading to a very black state. Application of voltage to electrodes causes the fluids to move between the channels. When the voltage is removed, neutral Young-Laplace pressure and contact-angle hysteresis stabilize the switched state. The device is multi-stable.

Consequently, the above electrowetting device structure provides high reflectivity and a low black state, enabling high contrast and saturated colors with a color filter approach. Moreover, the physics that stabilize the fluid do not limit the switching speed, so fast reset speeds are possible.

Displays are typically driven in one of several ways, depending on the amount information the display is sized to present. Direct drive segment-type displays are used for low information content, passive matrix for medium information content, and active matrix for high information content. In an example ebook application, an electrophoretic ink layer (capacitor) is driven by an active matrix backplane. To change the image, the capacitor must be erased, which generally requires multiple voltage pulses, and then re-written. While the erase can be performed globally, the new data must be written to every line in a row scanned sequence. The update can take as long as 700 milliseconds. The scan time, combined with the flash of the global erase step, leads to a significant flicker, and precludes video operation.

As mentioned above, conventional bi-stable displays such as electrophoretic, electrochromic, MEMS interference displays, and cholesteric liquid crystal displays are all effectively single-capacitor devices. As such, they are generally driven by charging and discharging a single capacitor. The driving circuit that controls these devices must overcome both the slow state transition physics, and the charging-related time constant to produce fast update rates. In contrast, the multi-stable electrophoretic display elements contain two capacitors, and the lateral translation of the optical shutter material greatly changes the capacitance between the two capacitors as it switches viewing states. The system is more complicated, but the changing capacitance and additional electrode provide a system where specific driving circuits can be used to achieve fast, flicker free updates.

What is needed is a multi-stable drive scheme for electrofluidic devices that takes advantage of the two-channel, two capacitor structure and fluid translation to achieve fast resets, a multitude of controlled multi-stable grayscale states, and video speed, and which provides accurate gray-scale switching between a high white state reflectance and fully saturated colors.

INTRODUCTION TO THE INVENTION

The present invention is directed to a device, an electrode configuration and a sequence for activating those electrodes for the purpose of switching device states quickly with minimum flicker during bi-stable image reset. The invention addresses the constraints of electrofluidic technology: 1) The polar fluid can be attracted to a position with voltage, but it cannot be repelled, and 2) because the polar fluid translates, changing its area against an electrode and thereby changing the capacitance, the time to discharge the capacitor formed by area contact with a polar fluid is significantly smaller than the time to charge a capacitor, which requires translation of the fluid. Setting the grayscale is based on discharging, not charging, when possible. In addition, the use of pixel-level partial reset states reduces the appearance of flicker further by minimizing the change in pixel state during data write/update.

It is a first aspect of the present invention to provide a display apparatus comprising: (a) a plurality of electrofluidic display elements, each element including: (i) a volume of a polar fluid, (ii) a volume of a non-polar fluid, (iii) a first substrate, (iv) a second substrate, (v) a conductive film between the first and second substrates that is porous to both the polar fluid and the non-polar fluid, the conductive film arranged relative to the first substrate to define a first channel and a second channel, (vi) a first electrode layered with a first dielectric layer, arranged between the conductive film and the first substrate, the first electrode configured to receive a voltage and cause the polar fluid to occupy the first channel, (vii) a second electrode including a second dielectric layer, the second electrode arranged between the conductive film and the second substrate, the second electrode configured to receive a voltage and cause the polar fluid to occupy the second channel, (viii) a first capacitor comprising the first electrode, the first dielectric layer, and the conductive film, and (ix) a second capacitor comprising the second electrode, the second dielectric layer, and the conductive film; and, (b) driving circuitry including a plurality of switching circuits in electrical communication with the plurality of electrofluidic display elements, where the plurality of switching circuits are configured to supply a switched voltage to the first capacitor and the second capacitor for each of the plurality of electrofluidic display elements, and where a difference in capacitor voltages is configured to change a coverage area of the polar fluid occupying the first channel.

In a more detailed embodiment of the first aspect, the difference in capacitor voltages is maintained for a fixed time by the driving circuitry to facilitate change in the coverage area of the polar fluid occupying the first channel. In yet another more detailed embodiment, a degree of initial difference in capacitor voltage set by the driving circuitry controls an amount of change to the coverage area of the polar fluid occupying the first channel. In a further detailed embodiment, a charge balance between the first capacitor and the second capacitor controls the coverage area of the polar fluid occupying the first channel. In still a further detailed embodiment, the driving circuitry changes polarity of the voltage bias on the first and second capacitors regularly. In a more detailed embodiment, a display frame rendered on the plurality of electrofluidic display elements includes an update rate faster than 300 milliseconds. In a more detailed embodiment, the polar fluid has a stable position in an absence of applied voltage in to at least one of the first channel and the second channel. In another more detailed embodiment, the plurality of electrofluidic display elements are arranged in a matrix of rows and columns, with the bottom capacitor connected to the output of a thin film transistor. In yet another more detailed embodiment, each of the plurality of electrofluidic display elements is configured to be in electrical communication with a storage capacitor. In still another more detailed embodiment, the first capacitor and the second capacitor are configured to have no voltage difference therebetween during a passive matrix drive where non-select lines are biased.

In yet another more detailed embodiment of the first aspect, a steady state condition for the polar fluid occurs when the voltage on the first capacitor is equivalent to the voltage on the second capacitor. In still another more detailed embodiment, the driving circuitry further includes: (1) a first subframe comprising a high logic state and an accompanying voltage signal to a viewer side electrode and a polar connection electrode, and a selectable first subframe logic state and a selectable accompanying voltage to a backside electrode of each of the plurality of electrofluidic display elements in a display channel to be updated, thereby providing a condition to have the polar fluid occupy the bottom channel; and, (2) a second subframe comprising a low logic state and an accompanying voltage for the viewer side electrode, a high logic state and an accompanying voltage for the polar connection electrode, and a selectable second subframe logic state and a selectable accompanying voltage to the backside electrode of each of the plurality of electrofluidic display elements in the display channel to be updated, provided by scanning row electrodes to turn a row of transistors to an on state while sending each pixel on the row of transistors a selectable voltage signal through column electrodes, thereby providing a condition to have the polar fluid occupy a viewer side channel. In a further detailed embodiment, the selectable first subframe logic state is common to each of the plurality of electrofluidic display elements during a frame. In still a further detailed embodiment, the selectable first subframe logic state is individually selected for each of the plurality of electrofluidic display elements by scanning the row of transistors during a frame. In a more detailed embodiment, scanning the row electrodes to the on state while sending each pixel on the row a selectable voltage signal through the column electrodes includes providing an appropriate charge to at least one of the plurality of electrofluidic display elements to create a display state, and moving to a next scanned row prior to completion of a movement of the polar fluid to an equilibrium condition. In a more detailed embodiment, the channel of the display to be updated is the entire display. In another more detailed embodiment, a time to set a pixel charge state in the second subframe is less than 5 milliseconds, and more preferably less than 0.5 milliseconds. In yet another more detailed embodiment, a polarity of logic signals and electrode voltages are alternated between display update frames. In yet another more detailed embodiment, the channel of the display to be updated is a fraction of the display and wherein the said driving electronics provide a first subframe comprising a low logic state and accompanying voltage signal to the viewer side electrode and the polar connection electrode, and a selectable voltage logic state and accompanying voltage to all the display elements in the display channel to be updated, thereby providing a condition to move polar fluid into the bottom channel, and a second subframe comprising a low logic state and accompanying voltage for the viewer side electrode, a high logic state and accompanying voltage for the polar connection electrode, and display element variable logic state to the backside electrode provided by scanning the row electrode to turn the row of transistors to the on state while sending each pixel on the row a selectable voltage signal through the column electrodes, thereby providing a condition to move polar fluid into the viewer side channel. In still a further detailed embodiment, reset states are included in the display apparatus, and the driving circuitry switches the polar fluid to a nearest reset state to a desired optical performance rather than a complete switching of the pixel.

It is a second aspect of the present invention to provide a display apparatus, the apparatus comprising: (a) a plurality of electrofluidic display elements, each element including: (i) a volume of a polar fluid, (ii) a volume of a non-polar fluid, (iii) a first substrate, (iv) a second substrate, (v) a conductive film between the first substrate and the second substrate that is porous to both the polar fluid and the non-polar fluid, the conductive film arranged relative to the first substrate to define a first channel occupied by at least one of the polar fluid and the non-polar fluid, (vi) a first electrode layered with a first dielectric layer, arranged between the conductive film and the first substrate, the first electrode configured to receive a voltage and cause the polar fluid to occupy the first channel, the conductive film arranged relative to the second substrate to define a second channel occupied by at least one of the polar fluid and the non-polar fluid, (vii) a second electrode layered with a second dielectric layer, arranged between the conductive film and the second substrate, the second electrode configured to receive a voltage and cause the polar fluid to occupy the second channel, (viii) a first capacitor comprising the first electrode, the first dielectric layer, and the conductive film, (ix) a second capacitor comprising the second electrode, the second dielectric layer, and the conductive film, (x) a first spacer interposing the first electrode and the conductive film, (xi) a second spacer interposing the second electrode and the conductive film, where at least one of the first spacer and the second spacer is translucent and aligned with a translucent region of the conductive film; and, (b) driving circuitry including a plurality of switching circuits in electrical communication with the first electrode, the second electrode, and the counter electrode, the driving circuitry configured to supply a switched voltage to the first capacitor and the second capacitor of a display element, where a difference in capacitor voltages changes a coverage area of the polar fluid occupying the first channel, and where the driving circuitry is in electrical communication with a light source located behind the first substrate, and where the switched voltages applied to the first capacitor and the second capacitor reposition the polar fluid within the first channel and the second channel and modify the transmitted light

DETAILED DESCRIPTION

The exemplary embodiments of the present disclosure are described and illustrated below to encompass a device, an electrode configuration and a sequence for activating those electrodes for the purpose of switching device states quickly with minimum flicker during bi-stable image reset. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure.

Figure 1:
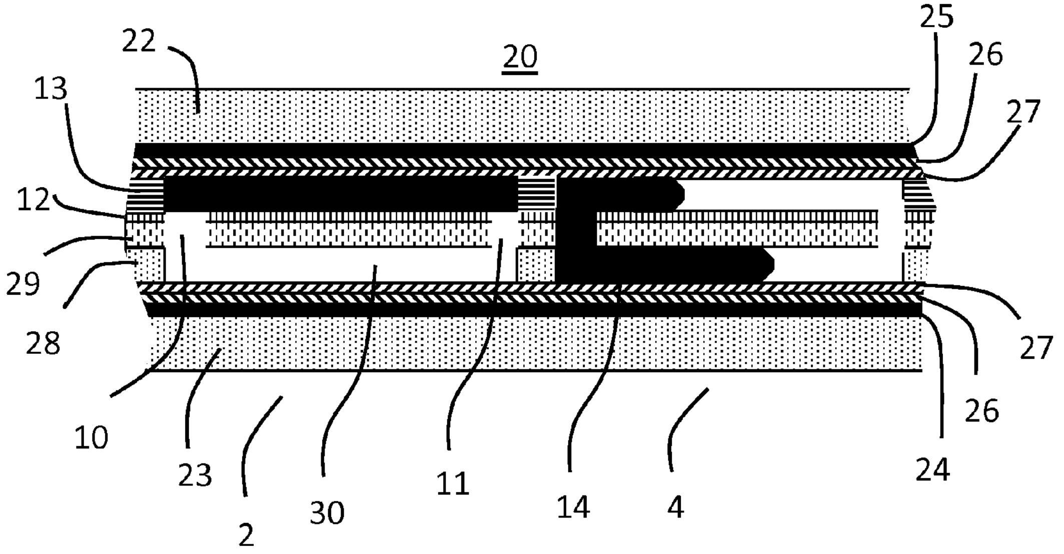
FIG. 1 is a diagrammatic view in partial cross-section of an electrofluidic device according to an embodiment of the invention.

Referencing FIG. 1, an electromechanical force on a conductive fluid on an electrical insulator underlies the physical mechanism for one embodiment of the present invention. This electromechanical force originates near a line of contact between a conductive fluid and a capacitor and is proportional to electrical capacitance times the square of the voltage applied. The electromechanical force is generally oriented so that the force is directed outward from the exposed surface of the fluid. This arrangement provides high-speed operation (on the order of milliseconds), low power capacitive operation (about 10 $mJ/m^2$), and excellent reversibility. However, alternative embodiments of the present invention include other fluid manipulation methods well-known by those skilled in the art of microfluidics. These alternate methods include, but are not limited to, electrowetting without insulators, thermocapillary, photo-responsive molecules such as spiropyrans, dielectrophoresis, and micro-electro-mechanical pumping.

A Cartesian coordinate system will be used to define specific directions and orientations. References to terms such as ‘above’, ‘upper’, and ‘below’, ‘lower’, are for convenience of description only and represent only one possible frame of reference for describing the invention. The dimensions of devices described herein cover a wide range of sizes from nanometers to meters based on the application. Terms such as visible will be used in some cases to describe a person or machine vision system or other optical source or detector that is facing towards the upper surface of the embodiments described herein.

The term liquid or fluid is used herein to describe any material or combination of materials that is neither solid nor plasma in its physical state. A gas may also be considered as a fluid so long as the gas moves freely according to the principles of the present invention. Solid materials, such as liquid powders, can also be considered a liquid so long as they move freely according to the principles of the present invention. Liquids or fluids can also contain any weight percent of a solid material so long as that solid material is stably dispersed in the liquid or fluid. The term liquid is not confining to any particular composition, viscosity, or surface tension. Unless otherwise noted, the terms concave and convex refer to the geometry associated with the smallest radius of curvature along a meniscus, it being understood that other larger radius of curvatures on a meniscus can be oppositely concave or convex, but having a weaker influence on the Young-Laplace pressure of the meniscus.

Figure 2:
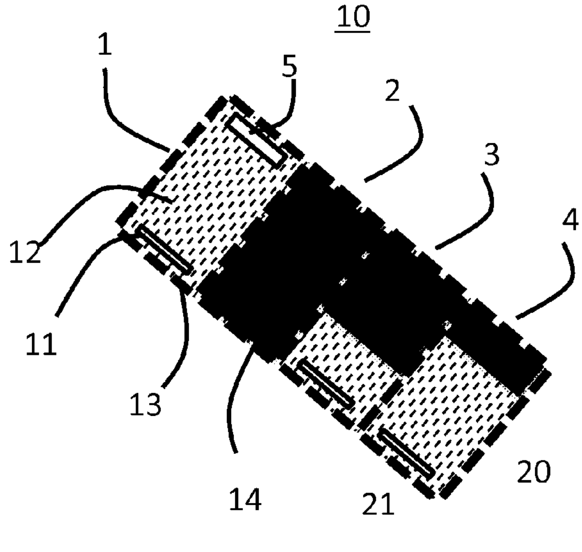
FIG. 2 is a top view of 4 pixels of the electrofluidic device of FIG. 1.

FIG. 1 shows a side view of two display elements. In some cases, this display element may be called a pixel. The element is comprised of a substrate, topstrate, and middle layer, which form two channels. One of these channels will face the viewer, and is referred to as the viewer-side channel. Polar and non-polar fluid bodies are positioned within these channels. The polar and non-polar fluids have different optical properties. For example, the polar fluid may contain a pigment and appear colored or black to the viewer while the non-polar fluid is transparent. The fluid may occupy numerous positions within the channel, each with different area coverage, as shown in the top view (FIG. 2). FIG. 2 shows the three exemplary device states, black on top (the viewer's side), white on top, and a mixed state. Depending on the choice of fluids, either the black fluid or the clear or 'white' fluid can be the polar fluid. The device operates by attracting the polar fluid to an electrode.

In the preferred embodiment, the position of the fluid is stable in any position, held in place by contact angle hysteresis in the channel and a balance of Young-Laplace pressure between the channels.

Figure 4:
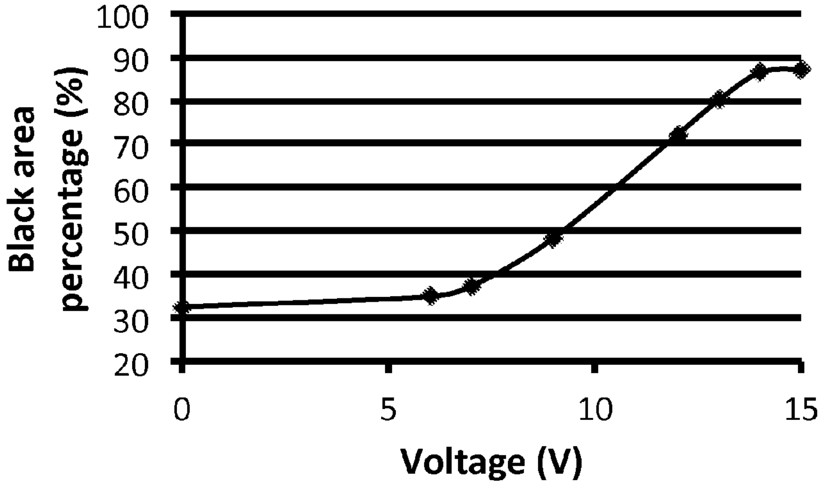
FIG. 4 is a plot of the area coverage of the viewer channel vs. voltage.

Electrodes are formed on the substrate and topstrate and are covered by dielectric and hydrophobic layers. The electrode on the middle layer is coated with a porous hydrophobic material and provides electrical contact to the polar fluid. Together, these electrodes form a capacitor in channel 1 and a capacitor in channel 2. When the polar fluid is not in the viewer-side channel, the capacitance of the viewer side channel forms between the topstrate electrode and the middle electrode, through the dielectrics of the non-polar fluid, the top electrode dielectric, and the hydrophobic layers. When the polar fluid completely fills the viewer-side channel, the polar fluid is in electrical contact with the middle electrode and the channel capacitance forms between the polar fluid and the topstrate dielectrics. When the polar fluid is partially in the viewer-side channel, the viewer-side channel capacitance results from the combination of the oil-filled volume and polar fluid-filled volume. Likewise, the bottom channel capacitance also varies with the position of the polar fluid. Consequently, the capacitance of the each channel varies greatly, potentially by a factor of 10, depending on the distribution of the polar fluid body between the two channels. This change in capacitance can be used to improve the electrical driving of the display apparatus. In FIG. 4, a voltage applied to the capacitors causes the polar fluid to move, changing its area coverage in the viewer channel in a very controlled manner.

With reference to FIG. 1 an electrofluidic device 20 is illustrated and comprises a first substrate 23, a conductive film 29, at least one capacitor having a hydrophobic surface, a spacer 28, a second substrate (topstrate) 22, a fluid vessel including ducts 5,11, a first fluid that can be a polar fluid 14, a second fluid that can be a non-polar fluid 30, and an energy source. The non-polar fluid 30 is immiscible with the polar fluid 14 and thus occupies space within the fluid vessel that is not occupied by the polar fluid 14. The fluid vessel has two channels and a fluidic connection such that the polar fluid 14 can move between the channels. The polar fluid 14 within the first and second channels, will have at least two surfaces that exhibit a convex curvature so long as the first and second channels, are suitably hydrophobic. Each convex surface will exhibit an inward Young-Laplace pressure according to $\Delta p = y/R$ where y is the interfacial surface tension between the polar fluid 14 and non-polar fluid 30 and R is the principle radius of curvature of the convex portions of the polar fluid 14. A meniscus can have more than one radius of curvature R, in which the net effect of the radii of curvatures is given as $(1/R_1+1/R_2+\ldots)$. Thus, in the electrofluidic device 20, if the first and second channels have similar surface energies, then the first channel will always impart a larger R than the second channel will impart onto the polar fluid 14. Therefore a net Young-Laplace pressure directs the polar fluid 14 into the first channel and the polar fluid 14 favors occupation of the first channel at equilibrium.

As illustrated in FIG. 1, the electrofluidic device includes two capacitors, each having a hydrophobic surface contacted by the polar fluid 14. The first capacitor includes a conductive electrode 24, dielectric coatings 26,27, and the conductive film 29. The second capacitor includes a conductive electrode 25, dielectric coatings 26,27, and the conductive film 29. Either of the polar fluid 14 or the electrode 24 of the capacitors can act as electrical ground or a bias electrode. While the electrofluidic device 20 can be operated with either one of capacitor on the second substrate or the capacitor on the surface of the conductive film 29, the use of both capacitors will approximately double the electromechanical force at a given voltage, and therefore result in a lower required operating voltage for the electrofluidic device 20. Generally the capacitor should provide a stored energy between about 1 $mJ/m^2$ and about 20 $mJ/m^2$.

The electrode 24 of the capacitor is formed from the combination of any electrically conductive material coated by any electrically insulating and hydrophobic dielectric coating 26,27. The material of the electrode 24 can be carbon, organic PEDOT-PSS, $In_2O_3$:$SnO_2$, aluminum, or any other material that is electrically conductive and in some cases exhibits a certain optical property such as optical absorption, reflection, or transmission. The dielectric material coating 26,27 that partially comprises the capacitor can be any material that is suitably electrically insulating at the voltages required for operation of the electrofluidic device 20, and any material that imparts a convex meniscus on polar fluid 14. Since the non-polar fluid 30 can be oil, even conventional polymers may be suitable dielectric material. A preferred material would be a fluoropolymer, as it promotes a highly-convex geometry on the polar fluid 14, has small wetting hysteresis, and is highly chemically inert. Suitable fluoropolymers include Asahi Cytop, Cytonix Fluoropel, and DuPont Teflon AF, to name a few. It is generally preferred that the fluoropolymer be less than about 1 μm in thickness to allow for low voltage operation of the capacitor. A thinner fluoropolymer provides a higher electrical capacitance and therefore require less voltage to achieve the electromechanical force for flow of the polar fluid 14. However, a thinner fluoropolymer is more susceptible to electrical breakdown, therefore a high breakdown field dielectric (not shown) such as $Si_3N_4$ or $Al_2O_3$ may be inserted between the dielectric coating 26,27 and the electrode 24 to promote high electrical capacitance and electrical reliability.

FIG. 3 further illustrates the energy source, which can be a voltage source, operable to provide a stimulus and alter the appearance of the electrofluidic device 20, as will be described in detail below. The voltage source can be analog, digital, a battery, a direct current voltage source, an alternating current voltage source, the drain electrode of a thin-film-transistor, or any suitable electrical source for applying the stimulus to the polar fluid 14. Suitable voltage sources are well known by those skilled in the art of voltage driven devices based on dielectrophoresis, electrowetting, liquid crystals, and micro electromechanics. A first terminal 32 of the voltage source is electrically connected to the electrode 24 of the capacitor while a second terminal 36 of the voltage source is electrically connected to the polar fluid 14. Alternatively, the first terminal 32 of the voltage source may also connect to the capacitor, as previously explained, and thereby doubling the total electromechanical force that can be applied to the polar fluid 14. The dielectric coating 26,27 can electrically insulate the first and second terminals 32, 36 of the voltage source. The electrical connection between the terminal 36 and the polar fluid 14 can be a wire or a conductive coating formed on a surface of the electrofluidic device 20 suitable to maintain voltage connection with the polar fluid 14 for all positions of the polar fluid 14 in the first or second channels.

Because the polar fluid 14 is electrically conductive, the two capacitors can also be driven in series wherein the first terminal 32 of the voltage source is electrically connected to the capacitor adjacent to the upper substrate 22, the second terminal 36 of the voltage source is connected to the capacitor adjacent to the lower substrate 23, and the polar fluid 14 is electrically floating but provides an electrical connection between the capacitors. This approach may simplify electrical connection, but will require a higher voltage in order to provide a suitable electromechanical force for movement of the polar fluid 14.

Referring back to FIG. 1, it is well known to those skilled in the art of electrofluidics that applying a stimulus, such as a voltage, between a conductive fluid (the polar fluid 14) and the electrode of the capacitor will create an electromechanical force that is directed away from the conductive fluid. That electromechanical force is operable to cause the conductive fluid to advance over the surface of the dielectric coating 26,27 over the electrode 24. Thus, alteration to the appearance of the viewable area 10 of the electrofluidic device 20 of the present embodiment is governed by electromechanical force and not by the contact angle as in conventional devices.

With continued reference to FIG. 1, the materials and construction of the electrofluidic device 20 is now reviewed in greater detail. It should first be noted that the materials and features presented are not a limited set, rather, the materials and features presented herein merely form an example set with which operation of the electrofluidic device may be performed. Numerous alternate or additional materials and features are easily perceived by one skilled in the art of electrofluidics or electronic displays, and the present invention therefore includes such obvious improvements or alternative embodiments.

The first substrate 23 is any substrate that is suitable for providing the degree of rigidity, flexibility, rollability, or conformability, desired in a given application for the electrofluidic device 20. Furthermore the first substrate 23 may provide a hermetic seal for the electrofluidic device 20. The second substrate 22 may provide similar functionality as the first substrate 23. At least the first substrate 23 or second substrate 22 should be suitably transparent to form the viewable area and thereby allow the polar fluid 14 and/or non-polar fluid 30 to be viewable at the desired wavelength(s) of light, in some cases including those outside the visible range of light. Non-limiting examples for the substrates include Corning 1737 glass, soda-lime glass, polymer substrates, textiles, metal foils, or semiconductor wafers, to name a few.

The conductive film 29 may be formed from any material that is able to impart the desired feature geometries for operation of the electrofluidic device 20. Geometries described herein are the first channel and the duct 5, but are not so limited. As such, the first channel and the duct are considered to be unitary, that is, the duct 5 and the first channel are formed as a unitary construction within the material of the conductive film, or from a common layer of material using the same or similar processes for formation. This unitary construction is preferred as it allows conventional planar manufacturing and microfabrication techniques to be used in making liquid crystal displays, computer chips, and the like; however, other methods may be used. Unitary construction allows for use of flexible substrates and eliminates problems encountered with alignment of such substrates. Furthermore, unitary construction allows the present invention to function with use of only two substrates and not an intermediate substrate, thus simplifying fabrication and maximum optical performance.

The conductive film 29 could be part of the first substrate with the conductive film 29 being formed by an etching process or by microreplication or molding. The conductive film 29 could be a distinct polymer that is photolithographically added onto the first substrate a suitable example being Microchem SU-8 or KMPR negative-tone photoresists. An example means by which the conductive film thickness can be determined is by calculation of contrast ratio for the electrofluidic device. If the first channel is one-tenth of the viewable area, a visual contrast ratio of about 1:10 could be achieved for the electrofluidic device. This would require that the conductive film 29, and therefore the first channel, to be about 10 times thicker than the height of second channel (i.e. the volumes of the first and second channels, being similar). Generally, the second channel should have at least twice the surface area-to volume ratio as the first channel.

The duct 5 can be the absence of the conductive film material. The duct 5 can alternatively be any feature, including geometrical alterations of the first channel, that promotes ease of fluid flow or improved reproducibility of flow of the fluids. Counter fluid movement via the duct 5 increases the speed of fluid movement and improves regularity of the direction of fluid movement within the electrofluidic device 20. In this way, the electrofluidic device 20 is highly manufacturable by having few fabrication steps and only requiring the alignment of features to the first substrate 23. Based on the geometry of the duct 5, the polar fluid 14 may or may not occupy the duct 5 at equilibrium.

The spacer 13 serves the role of regulating the height of the second channel and/or the role of terminating the advancement of the polar fluid 14 into the second channel. Spacer materials can be any material that is sufficiently rigid or flexible. For high-contrast display applications the spacer 13 may be formed from a black or white colored material or for transmissive applications the spacer 13 may be transparent. As is commonly used in rollable or flexible displays, the spacer 13 may also serve the role of physically adhering features on the first substrate 23 to features on the second substrate 22.

The polar fluid 14 can be comprised of a carrier liquid and a pigment dispersed within the carrier liquid and has a differential Young-Laplace pressure ranging from about 0.02 $N/cm^2$ to about 10 $N/cm^2$ when the polar fluid 14 simultaneously contacts the coating of the capacitor and the non-polar fluid 30. It is generally preferred that the carrier liquid, dyes soluble in the carrier liquid, or the pigment will provide an optical absorption or reflection at a given band of optical wavelengths so as to provide an optical effect, which will be described in detail below.

The carrier liquid is typically a polar fluid such as water, alcohol, polyols, cellosolves, carbitols, glycols, ether alcohols, aliphatic alcohols, ethers, ketones, chlorinated hydrocarbons, pyrrolidones, polar aprotics, aldehydes, acetates, polyglycols, plasticizers such as phthalates, or mixtures thereof. The pigments can be in amounts ranging from about 0.1% weight to about 40% weight, based on the total weight of the pigment dispersion. Particles comprising the pigment dispersion can have a mean weight diameter value ranging from about 10 nm to about 500 nm and include azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof.

For the case of the polar fluid 14 in the second channel, the pigment provides a color saturation corresponding to a minimum Maxwell triangle of (0.3, 0.4), (0.4, 0.3), (0.3, 0.3) as depicted on a 1931 CIE Chromaticity diagram.

The polar fluid 14 can also contain various additives, such as surfactants, to lower the interfacial surface tensions. Suitable surfactants include anionic, cationic, catanionic, nonionic, and zwitterionic surfactants, such as sulfonates, phosphonates, ethylene oxides and propylene oxides containing a hydrophobic head, block and random co-polymers, alkyl amines such as primary, tertiary, and quaternary amines, pyrrolidones, naphthalene condensates, alkynes, carboxcylic acids, amines, or mixtures thereof.

The polar fluid 14 may further contain resins, i.e. ionic polymers such as acrylics, styrene-maleics, styrene-acrylics, styrene maleic acid amides, quaternary salts or mixtures thereof. Nonionic polymers may also be appropriate, especially EO/PO units.

The polar fluid 14 may further contain humectants, such as those taught in U.S. Pat. No. 7,160,933, incorporated by reference herein in its entirety, or monohydric alcohols with carbon chains greater than about 10 carbon atoms, such as decanol, dodecanol, oleoyl alcohol, stearoyl alcohol, hexadecanol, eicosanol, polyhydric alcohols, such as ethylene glycol, alcohol, diethylene glycol (DEG), triethylene glycol, propylene glycol, tetraethylene glycol, polyethylene glycol, glycerol, 2-methyl-2,4-pentanedio, 2-ethyl-2-hydroxymethyl-1,3-propanediol (EHMP), 1,5-pentanediol, 1,2-hexanediol, 1,2,6-hexanetriol and thioglycol; lower alkyl mono- or di-ethers derived from alkylene glycols such as ethylene glycol mono-methyl or mono-ethyl ether, diethylene glycol mono-methyl or mono-ethyl ether, propylene glycol monomethyl or monoethyl ether, triethylene glycol mono-methyl or mono-ethyl ether, diethylene glycol di-methyl or di-ethyl ether, poly(ethylene glychol) monobutyl ether (PEGMBE), and diethylene glycol monobutylether (DEGMBE); nitrogen-containing compounds such as urea, 2-pyrrolidinone, N-methyl-2-pyrrolidinone, and 1,3-dimethyl-2-imidazolidinone; and sulfur-containing compounds such as dimethyl sulfoxide and tetramethylene sulfone; and mixtures thereof.

The polar fluid 14 can further contain chemicals, such as miscible fluids or salts to further stabilize the dispersion and/or to alter the boiling or freezing point of the first fluid. The pigments preferably are stabilized by incorporation of dispersing polymers, dispersing agents, synergists, surfactants, surface treatment, or encapsulation.

Surfactants, dispersants, resins, or combinations thereof within the polar fluid 14 can be in amounts ranging from about 0.1% to about 200% by weight, based on the weight amount of the pigment.

In some embodiments, the polar fluid 14 may support one or more distinct phases.

In preparing the polar fluid 14, the components are premixed in a vessel equipped with a high-speed stirrer. The mixture may then be passed through a rotating ball mill or agitated media mill, which may be batch operation or by way of recirculation and/or discrete pass, containing media such as glass, ceramic, steel, or organic polymer that is about 30 μm to about 5.1 cm in size. Typical mills include those manufactured by Eiger, Netzsch, Buhler, Premier, Chicago Boiler, Drais, Union Process, etc. Alternatively, dispersions may be produced on batch process equipment such as a rotating ball mill or an agitated ball mill such as stirring. The former is typified by those provided by Paul-O-Abbe; the latter is typified by those supplied by Union Process. Media size for either may range in size noted above, and media shape may be circular, regular, irregular, or a mixture thereof. The dispersion may also be prepared on any high-energy disperser with a shear mechanism such as an IKA Works, Baker-Perkins, etc., sigma blade mixer. The dispersion is optionally filtered (or centrifuged) to remove large particles such as undispersed particles, media, or contaminants is any fluid that is adequately electrically conductive and which achieves a convex meniscus inside the second channel.

The polar fluid 14 should have a surface tension ranging from about 5 dynes/cm to about 80 dynes/cm and a viscosity of less than about 20 cp. When the polar fluid 14 is located within the second channel, the polar fluid will be characterized by a minimum transmission of less than about 30% or a minimum reflection of less than about 30%.

The second fluid, i.e. the non-polar fluid 30, should be immiscible with the polar fluid 14, and further should not form an emulsion with the polar fluid 14. The non-polar fluid 30 can be comprised of alkanes, silicone oil, fluorosolvents, gases, or mixtures thereof. Generally, oil is preferred as it reduces the effects of gravity and contact angle hysteresis, can increase the Young's contact angle of the polar fluid 14, can properly electrically insulate the space not occupied by the polar fluid 14, and therefore allows freedom of movement of fluids between the first and second channels. In some embodiments, such as electronic paper applications, the non-polar fluid 30 can be white in color, i.e. a solution of a high refractive index metal-oxide dispersion within a low refractive index oil or a non-miscible liquid inside the oil. The non-polar fluid 30 will have a cross-solubility level with the polar fluid 14 that is less than about 10% and preferably less than about 1%. Further, the non-polar fluid 30 should have an interfacial tension value with deionized water of about 2 dynes/cm to about 60 dynes/cm and a viscosity of less than about 20 cp.

The non-polar fluid 30 can further contain a colorant, including soluble dyes, organic pigments, inorganic pigments, or combinations thereof. Suitable pigments include those having an average particle size, indicated by a mean weight diameter, of about 10 nm to about 500 nm. These include azo, azomethine, methane, anthraquinone, phthalocyanine, perinone, perylene, diketopyrrolopyrrole, thioindigo, dioxazine, iminoisoindoline, iminoisoindolinone, quinacridone, flavanthrone, indanthrone, anthrapyrimidine, quinophthalone, carbon black, metal oxides, mixed metal oxides, antimony yellow, lead chromate, lead chromate sulfate, lead molybdate, ultramarine blue, cobalt blue, manganese blue, chrome oxide green, hydrated chrome oxide green, cobalt green, metal sulfides, cadmium sulfoselenides, zinc ferrite, and bismuth vanadate, derivatives thereof, mixtures thereof, or solid solutions thereof. The colorant can comprise an amount of about 0.1% to about 40% by weight based on the total weight of the pigment.

In some embodiments, the colorant can be a material that has a refractive index that differs from the refractive index of the non-polar fluid 30 by at least 0.05. In this way, the colorant will impart a diffuse white color onto the non-polar fluid 30.

Before dispersing the pigment within the non-polar fluid 30, the pigment particles can be pre-treated by dispersing the pigment within a non-polar fluid in the presence of at least one dispersant and optionally a synergist and/or UV absorbers. UV absorbers include those taught in U.S. Pat. Nos. 7,066,990 and 7,018,454, incorporated herein in their entirety, as well as hydroxyphenylbenzotriazoles; tris-aryl-s-triazines; benzophenones; α-cyanoacrylates; oxanilides; benzoxazinones; benzoates; o-alkyl cinnamates; 5-chloro-2-(2-hydroxy-3,5-di-tert-butylphenyl)-2H-benzotriazole; 2-(2-hydroxy-3,5-di-tert-butylphenyl)-2H-benzotriazole; 2-(2-hydroxy-3,5-di-tert-amylphenyl)-2H-benzotriazole; 2-(2-hydroxy-3,5-di-α-cumylphenyl)-2H-benzotriazole; 2-(2-hydroxy-3-α-cumyl-5-tert-octylphenyl)-2H-benzotrizole; 2-(2-hydroxy-5-tert-octylphenyl)-2H-benzotrizole; 2-(2-hydroxy-5-methylphenyl)-2H-benzotriazole; 2-(2-hydroxy-3-tert-butyl-5-methylphenyl)-2H-benzotriazole-5-sulfonic acid, sodium salt; 3-tert-butyl-4-hydroxy-5-(2Hbenzotriazol-2-yl)-hydrocinnamic acid; 12-hydroxy-3,6,9-trioxadodecyl-3-tert-butyl-4-hydroxy-t-(2H-benzotriazol-2-yl)-hydrocinnamate; octyl-3-tert-butyl-4-hydroxy-5-(2H-benzotriazol-2-yl)-hydrocinnamate; 2-(3-t-butyl-2-hydroxy-5-(2-omega-hydroxy-octa-(ethyleneoxy)carbonyl-ethyl)-phenyl)-2H-benzotriazole; 4,6-bis(2,4-dimethylphenyl)-2-(4-octyloxy-2-hydroxyphenyl)-s-triazine; 2,4-bis(2-hydroxy-4-butyloxyphenyl)-6-(2,4-bisbutyloxyphenyl)-1,3,5-triazine; 2-[4-(dodecyloxy/tridecyloxy-2-hydroxypropoxy)-2-hydroxyphenyl]-4,6-bis(2,4-dimethylphenyl)-1,3,5-traizine; the reaction product of tris(2,4-dihydroxyphenyl)-1,3,5-triazine with the mixture of α-cholorpropionic esters (made from isomer mixture of C7 or C9 alcohols); 2,4-dihydroxybenzophenon; 2,2',4,4'-tetrahydroxy-5,5'-disulfobenzophenone, disodium salt; 2-hydroxy-4-octyloxybenzophenone; 2-hydroxy-4-dodecyloxybenzophenone; 2,4-dihydroxybenzophenone-5-sulfonic acid and salts thereof, 2-hydroxy-4-methoxybenzophenone-5-sulfonic acid and salts thereof; 2,2'-dihydroxy-4,4'-dimethoxybenzophenone-5,5'-disodium sulfonate; 3-(2H-benzotriazol-2-yl)-4-hydroxy-5-secbutyl-benzenesulfonic acid, sodium salt; and 2-(2'-hydroxy-3'-tertbutyl-5'-polygycolpropionate-phenyl)benzotriazole; and mixtures thereof.

The non-polar fluid 30 may also include a dispersant to stabilize the pigment particle in the solution or to aid in the dispersion process. Appropriate dispersants can include those having hydrophobic or hydrophilic properties. In some instances, the dispersant will include a synergist, or a derivative of the colored pigment, to further stabilize the pigment dispersion. Synergists can be synthesized separately and added to a dispersion, formed directly on the pigment as in U.S. Pat. Nos. 6,911,073 and 5,922,14, incorporated herein in their entirety, or formed during the manufacture of the pigment as in U.S. Pat. Nos. 5,062,894 and 5,024,698. The total amount of dispersant within the second fluid can typically be an amount of about 0.1% to about 200% by weight, based on the weight of the pigment. The synergist can be in the amount of about 0% to about 200% by weight, based on the weight of the pigment.

Preparation of the non-polar fluid 30 begins with premixing the dispersant and the non-polar fluid in a vessel equipped with a high-speed stirrer. The mixture is then passed through a rotating ball mill or agitated media mill which may be a batch operation or by way of recirculation and/or discrete pass, containing media such as glass, ceramic, steel, or organic polymer that is about 30 μm to about 5.1 cm in size. Typical mills are those manufactured by Eiger, Netzsch, Buhler, Premier, Chicago Boiler, Drais, Union Process, etc. Alternatively, the dispersions may be produced on batch process equipment, such as a rotating ball mill or agitated ball mill, such as stirring. The former is typified by those provided by Paul-O-Abbe; the latter is typified by those supplied by Union Process. Media size for either may range in size noted above and the shape may be circular, regular, irregular, or combinations thereof. Equally, the dispersion may be prepared on any high energy disperser with a shear mechanism such as an IKA Works, Baker-Perkins, etc., sigma blade mixer. The dispersion is optionally filtered or centrifuged to remove large particles such as undispersed particles, media, or contaminants.

Moving now to FIG. 3 to illustrate one method of moving the polar fluid 14 and thereby altering the appearance of the electrofluidic device 20. A stimulus is applied by the voltage source between the polar fluid 14 and the electrode of the capacitor. Once a sufficient voltage, i.e. a threshold, is reached, the electromechanical force is created and pulls the polar fluid 14 from the first channel and into the second channel of the fluid vessel, thereby increasing the amount of polar fluid 14 occupying the viewable area. This occurs as soon as the electromechanical force (per unit area) exceeds the Young-Laplace pressure (force per unit area) and other effects such as contact angle hysteresis. Based on the geometry of the second channel, the interfacial surface tension between the polar fluid 14 and non-polar fluid 30, and contact angle hysteresis, it is possible to determine that this threshold for polar fluid flow into the second channel is in the range of about 0.02 $N/cm^2$ to about 10 $N/cm^2$. If the electromechanical force is suitably lowered below this threshold, the polar fluid 14 will retract back into the first channel of the fluid vessel due to the influence of the Young-Laplace pressure. The viscosity of the polar fluid 14 and the non-polar fluid 30, in combination with the electromechanical force, can result in a speed of transfer of the polar fluid 14 that is greater than about 0.1 cm/s.

Figure 3A:
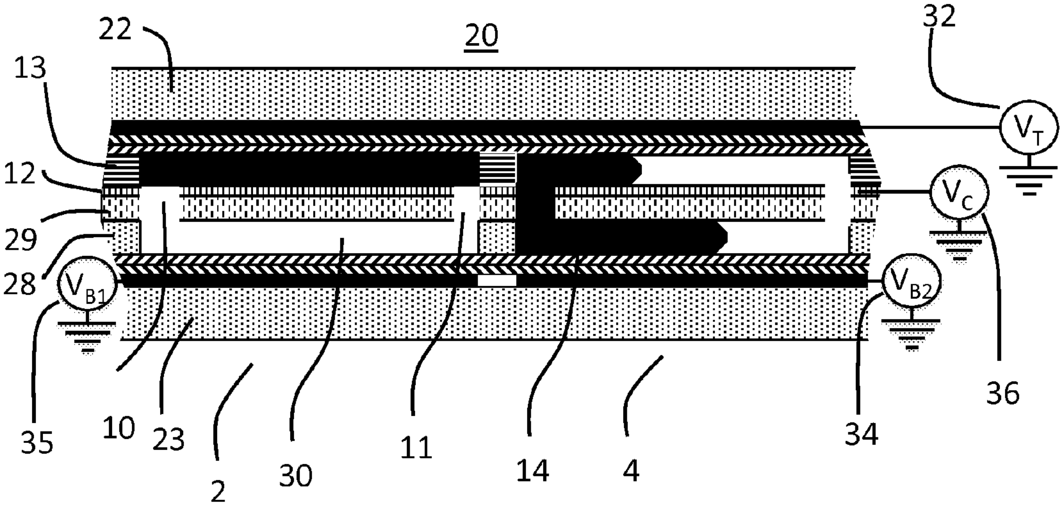
FIG. 3A is a diagrammatic view in partial cross-section of the electrofluidic display element of FIG. 1 showing electrical connection.

The device shown in FIG. 3A details a cross-section of the top several device layers of a display apparatus. The device contains two channels (viewer-side and back-side) connected by smaller apertures. The device includes three electrodes $V_T$, $V_C$, $V_B$ for top, center, and bottom, respectively. In a thin film driven display, $V_B$ would be the TFT pixel electrode, for example. Vc makes direct electrical contact to the fluid while Vt and Vb are coupled via capacitor layers. $V=V_{HI}$ refers to the preferred maximum voltage state needed to switch the fluid from one position to another.

Figure 3B:
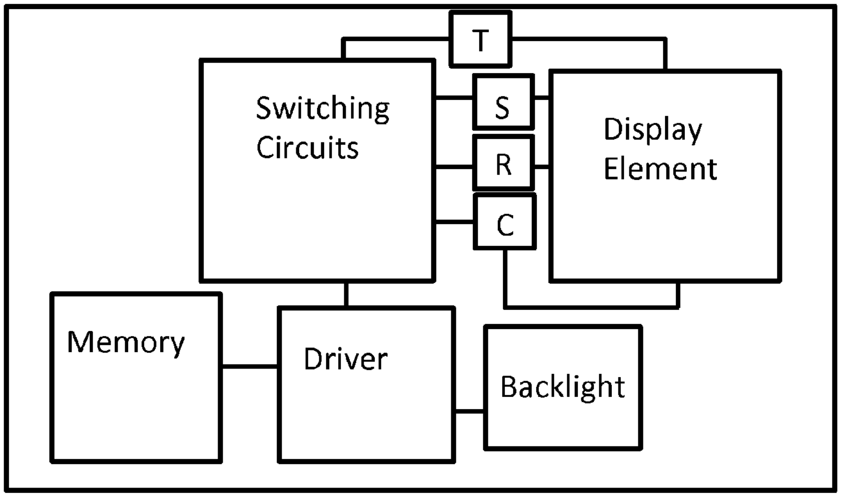
FIG. 3B is an example active matrix circuit incorporating the display element.

The electrodes of the display elements are connected to driving circuitry for the purpose of writing an image to the plurality of display elements. FIG. 3B shows example elements of the driving circuitry for a transflective active matrix display, including row, column, select line, and top electrode switching circuits, the image driver, memory, and a backlight controller. In general, the driving circuitry updates the image on the display during what is termed a display frame. As an example, a traditional liquid crystal graphic display can write new images to the display faster than 30 Hz or 30 times per second. This time is generally faster than the flicker perception time of humans, and hence, the viewer cannot detect the update scan. Electrophoretic paper often cannot write to a graphical display faster than 2 Hz frame write. The display update is clearly visible and is incompatible with video rate operation. In contrast, the two-channel electrofluidic display is capable of fast frame updates.

Several driving strategies employ the concept of charge balance in the capacitors to set the final state. This allows a scanning drive scheme to quickly set the charge on the display element capacitors, disconnect the display element, and then have the transition to the final pixel state proceed independent of the address scan speed. The general idea is that charge can be placed on one of the capacitors in the display element. This charge causes the polar fluid to move, but as it does, it reduces the area of capacitance of the polar fluid. This causes more charge to inhabitant a small capacitor area, thereby increasing the voltage. The translation of the polar fluid proceeds until the voltage on each capacitor is equivalent, thereby setting a steady state condition for the fluid.

The following examples and comparative example illustrate particular properties and advantages of some of the embodiments of the present invention. Furthermore, these are examples of reduction to practice of the present invention and confirmation that the principles described in the present invention are therefore valid.

Figure 5:
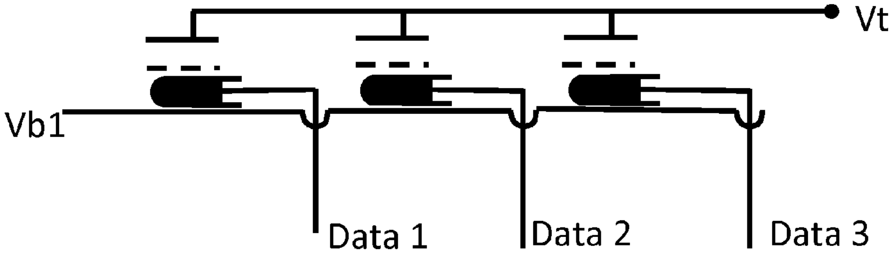
FIG. 5 is a direct drive scheme with a driven polar fluid connection.

Different types of displays employ different update strategies. The simplest display is driven by 'direct drive'. This is common for segmented displays, clocks, etc. where the number of addressable elements is small. In segmented displays, the electrodes of a block of display elements may be connected together to form a larger controlled element. In the embodiment of FIG. 5, the driving circuit connects to (a) the topstrate electrode, which common to all addressable elements, (b) the bottom electrode, which is a single switching circuit for all addressable elements capable of +/−Vb, and (c), the plurality of middle electrodes for each addressable element, which is a plurality of switching circuits capable of switching each addressable element individually through +/−Vc.

In one embodiment, called Vb select, the driving circuit contains a memory cell which remembers this previous state of the addressable display element. A display update frame comprises setting the topstrate electrode Vt=0 and setting the substrate electrode Vb to a logic high state, $+V_{Hi}$. This sets the addressable element up with a difference between capacitor voltages. Concurrently, Vc for all display elements individually set to drive the polar fluid one direction or another, for a certain period of time. For example, a pixel that is 20% black in the viewer channel can be driven to less black by setting Vc=0, thereby providing the voltage difference in backside channel, and creating a electromechanical pressure on the fluid to move it to the back side channel. A pixel that is 20% black in the viewer channel can be driven to more black by setting Vc=+Hi, thereby providing the voltage difference in the viewer side channel, and creating a electromechanical pressure on the fluid to move it to the viewer side channel. Grayscale is set by the drive circuitry using a combination of analog voltage and pulse width control. In this embodiment, the frame update has a specified time. The speed at which the polar fluid moves is a function of the square of the voltage difference. The drive circuitry computes a voltage difference that will move the drop the specified amount during the frame time. At the end of the frame, the drive circuitry sets Vb=Vt=Vc=0 to freeze in the new display image.

In general, the maximum frame time is the amount of time needed with the maximum capacitor voltage difference to cause a complete transition between pixels. This depends on the size of the electrofluidic pixel and the viscosity and interfacial surface tension of the polar fluid. Typical values range between 20 msec and 150 msec for display elements less than 400 um in length.

In order to prevent charge build-up from impurities in the polar and non-polar fluids on either capacitor plate, the polarity of the drive scheme is switched on subsequent frames. Frame 2 would set Vb=−Hi and Vc between −Hi and 0.

The previous direct drive embodiment is subject to cumulative grayscale errors as the driving electronic's assessment of the grayscale state of a pixel builds up errors over time. Grayscale resets are one solution. They define specific stopping points. In another direct drive embodiment, the grayscale can be set absolutely by using 'write white' and 'write black' subframes. The electronics write in two subframes, the first of which writes all pixels to a full white state, setting Vt=0, Vb1=+Hi, and Vc=0 for all addressable elements. This write is accomplished between approximately 1 msec and 300 msec, depending on your properties of the fluids and the length of the display elements. Next, Vt=0, Vb1=+Hi, and Vc=0 to +Hi, setting up the difference in voltage between capacitors. The speed at which the polar fluid moves is a function of the square of the voltage difference. The drive circuitry computes a voltage difference that will move the drop the specified amount during the frame time. At the end of the frame, the drive circuitry sets Vb=Vt=Vc=0 to freeze in the new display image.

In order to prevent charge build-up from impurities in the polar and non-polar fluids on either capacitor plate, the polarity of the drive scheme is switched on subsequent frames. Frame 2 would set Vb=−Hi and Vc between −Hi and 0.

Figure 6:
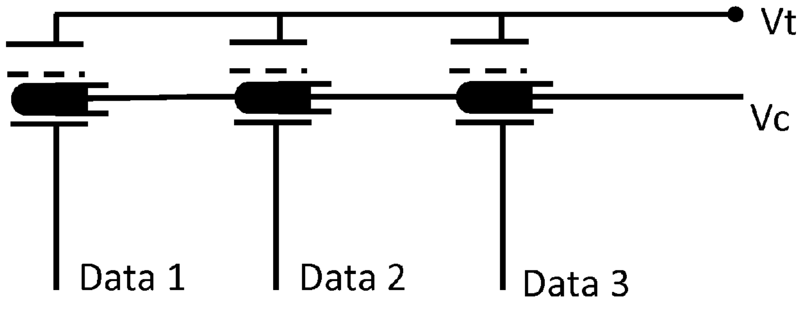
FIG. 6 is a direct drive scheme with a driven substrate capacitor electrode.

In the embodiment of FIG. 6, the driving circuit connects to (a) the topstrate electrode, which common to all addressable elements, (b) the middle electrode, which is a single switching circuit for all addressable elements capable of +/−Vc, and (c), the plurality of bottom electrodes for each addressable element, which is a plurality of switching circuits capable of switching each addressable element individually through +/−Vb.

The display update frame is divided into 2 subframes, 'write white' and 'write black'. The driving circuit contains a memory cell which remembers this previous state of the addressable display element. The first subframe switches display elements that must switch to a higher state to more black, and does not switch the others. To do so, Vt=0, Vc=+Hi, and Vb=+Hi (or variable voltage) for elements that must switch to more black, and Vb=0 for other elements. In the next step, Vt=0, Vc=0, and Vbi=+Hi, variable voltage, fixed time, or variable time, fixed voltage for pixels switching to more white, Vbi=0 for the others. At the end of the frame, the drive circuitry sets Vb=Vt=Vc=0 to freeze in the new display image. The image update time of the two subframes is equivalent to the twice the amount of time it takes to switch an addressable element through a complete state change. This write is accomplished between approximately 2 msec and 600 msec, depending on your properties of the fluids and the length of the display elements. The write black and write white components are this drive prevent a 'flicker' caused by having display elements transition to states with the opposite color as the desired final state (i.e. no unneeded transitions).

In order to prevent charge build-up from impurities in the polar and non-polar fluids on either capacitor plate, the polarity of the drive scheme is switched on subsequent frames. Frame 2 would set Vc=−Hi and Vb between −Hi and 0.

In another embodiment for driving the display with the circuit described in FIG. 6, The display update frame is divided into 2 subframes, 'erase' and 'write'. In contrast to the previous drive scheme, this driving circuit contains no pixel memory and therefore does not accumulate grayscale errors, but it loses the advantage of having no un-needed transitions. The first subframe switches all display elements to the viewer channel. To do so, Vt=0, Vc=+Hi, and Vb=+Hi. In the next subframe, Vt=0, Vc=0, and Vbi=variable voltage from 0 to +Hi to switch the pixels to their final state. At the end of the frame, the drive circuitry sets Vb=Vt=Vc=0 to freeze in the new display image. The image update time of the two subframes is equivalent to the twice the amount of time it takes to switch an addressable element through a complete state change. This write is accomplished between approximately 2 msec and 600 msec, depending on your properties of the fluids and the length of the display elements.

In order to prevent charge build-up from impurities in the polar and non-polar fluids on either capacitor plate, the polarity of the drive scheme is switched on subsequent frames. Frame 2 would set Vc=−Hi and Vb between −Hi and 0.

Figure 7:
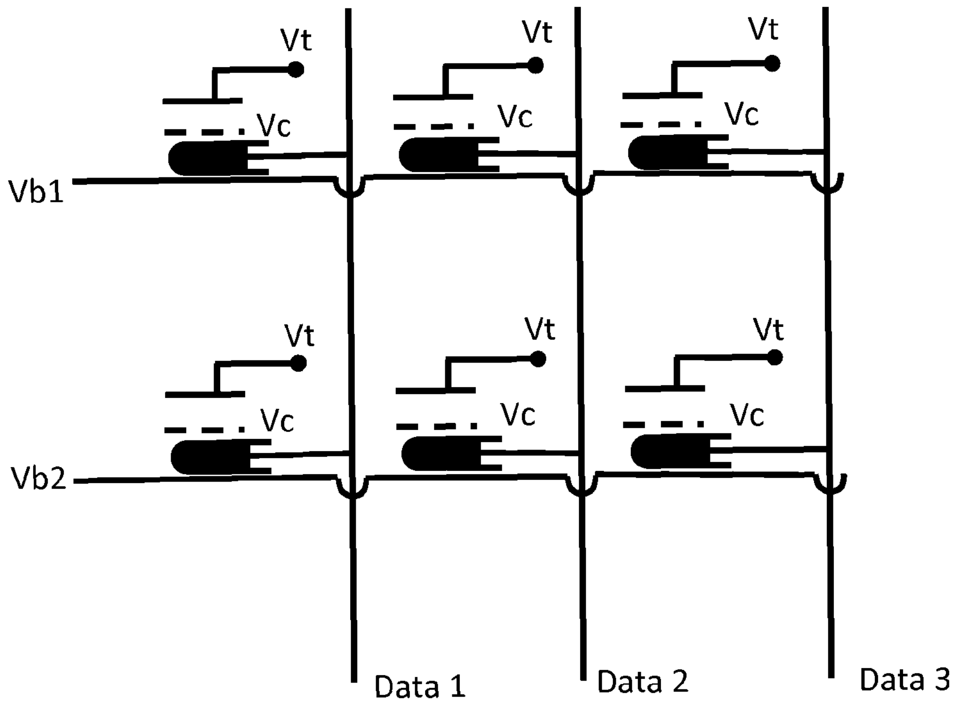
FIG. 7 is a passive matrix drive scheme.

FIG. 7 depicts a circuit diagram for a passive matrix electrofluidic device containing two capacitors. In a passive matrix device, the display elements are typically arranged in rows and columns, and each is addressed through row and column electrodes connecting to switching circuits. Moreover, the rows are scanned sequentially through a select state such that only one row is selected at a time and only the select row is updated by the column switches at a time. During each select state, all the columns dump data to the display elements on the selected line, thereby setting there state without influencing the other pixels. The key concept in passive matrix drive for this device is capacitor voltage balance for the all the non-selected rows. In short, the topstrate electrode is connected to a shared circuit among the display elements (i.e. Vt=0), the substrate electrode is connected to the scanning columns such that $Vb_{off}$=0 and $Vb_{select}$=+Hi, and the column data (comprised of a switched voltage output for each column) sets the middle electrode Vc from 0 to +Hi for a given time period, which sets the state of the pixel. Even though the polar fluid of every display element is being charged through the middle electrode for each scanned line, the non-selected pixels have no voltage difference between the viewer side and backside capacitors, so capacitors, so the fluids do not move. In contrast to LCDs driven by passive matrix, little cross-talk occurs because of this.

In one embodiment of passive matrix drive, a display update uses an erase frame. One approach is a first subframe which writes the display to one color, and then a second subframe that scans the data into each pixel. Because all the rows can be addressed at once, the overall can time is the (row scan time+1). However, the viewer sees an erased screen for a significant part of the scan. As an example, the erase frame sets Vt=+Hi, Vc=Hi, and Vb for all rows=0 (a white erase state is good for text on paper). Next, Row 1 is selected first such that Vt=0, Vb(row1)=+Hi, and Vc=0 to Hi for variable times to set the state of each display element on the select line. The capacitor balance prevents non-selected rows from being reset. The scan moves to Row 2 and repeats through all the rows.

A second approach is use a single frame, but to divide each row select time into two data states: Upon line select, the columns first erase the entire line to a full color. Next they write the selected line to the final state. This avoids a full screen erase state but doubles the image scan time.

A more refined approach for either erase states is to switch alternating display elements on the select line to alternating 'erased' states (i.e. black-white-black-white-black . . . ). This will provide an overall neutral 50% grayscale reset state to the viewer. It is more appropriate for images than for text (with a predominantly white background).

A third approach is to configure the driving electronics to remember the state of the previously displayed pixel. The display can then be addressed with a 'write black', 'write white' strategy. An example drive scheme is as follows: Select Row 1, Vt=0, Vb(row 1)=Hi, Vb (other rows)=0. If the display element needs to become more black to the viewer, the column voltage Vc will switch Hi to drive the polar fluid to the viewer side channel, and be modulated for a specific time (pulse width) to achieve the desired grayscale state. If the display element needs to become more white to the viewer, the column voltage Vc will switch Lo (or 0) to drive the polar fluid to the backside side channel, and be modulated for a specific time (pulse width) to achieve the desired grayscale state. The row then scans to the next line and repeats until the end of the frame.

In both these embodiments, each column scan requires the between 1 and 300 msec of write time per line, depending on the properties of the fluids and the size of the display element. Updating a 20 line display could take between 20 msec and 3 seconds, so the update is not video rate for this many lines.

In order to prevent charge build-up from impurities in the polar and non-polar fluids on either capacitor plate, the polarity of the drive scheme is switched on subsequent frames. Frame 2 would set Vc=−Hi and Vb between −Hi and 0.

Finally, passive matrix addressing makes it very easy to erase and write only a small section of the display, as might be done with a graphical menu.

Figure 8A:
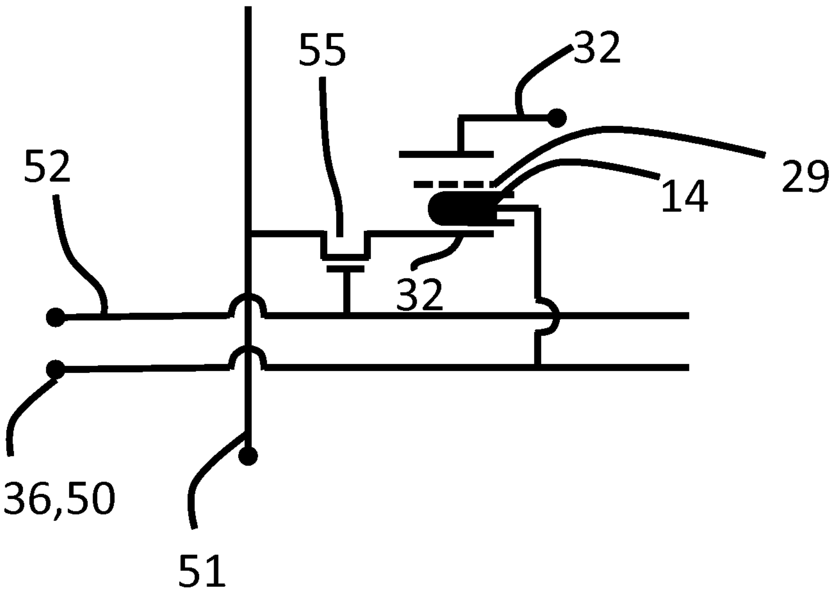
FIG. 8 is an active matrix drive scheme with an equivalent variable capacitor circuit.
Figure 8B:
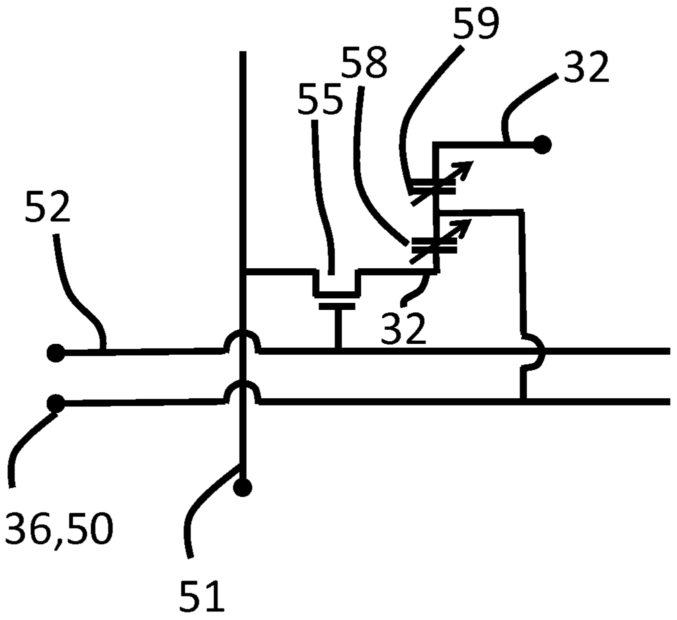

FIG. 8 is a schematic of an active matrix driven display element. The elements in a display apparatus are typically arranged in a row-column matrix. The display element is connected to the drain of a thin film transistor (TFT). A simple manufacturing approach connects the substrate electrode (Vb) to the TFT drain. The source of the TFT is connected to column electrode circuitry providing switching voltage signals. The gate of the TFT is connected to row electrode circuitry providing sequentially-scanned row select capability. The row circuitry may also turn on all the rows at once. In typical embodiments, the topstrate electrode is common to all pixels to simplify fabrication, and the middle electrode (Vc) is connected either to all pixels or broken out into rows.

In one embodiment designed to produce minimal flicker and fast update rates, the active matrix TFTs are connected to the substrate electrode Vb. A global reset or erase frame is used to set all pixels to one position and to an energetic condition, Vt=0, Vc=0, all row select lines=On, and Vb=Hi for all outputs (or Vt=Hi, Vc=Hi and Vb=0). This moves the polar fluid to the bottom channel, and requires 1 to 300 milliseconds depending on the property of the fluid and the size of the pixel. However, for pixels and fluids used in an active matrix display, the pixel speed is less than 30 milliseconds. Equally as importantly, this step charges the backside capacitor, creating an energy of $\frac{1}{2}\times CV^2$ on the capacitor, setting up the conditions necessary for charge balance-based writing to the screen. The image is then updated by scanning each row with the select line, and by writing data to each row with the bank of column switching circuits. For a selected line, Vt=Hi, Vc=0 and Vb=+Hi to 0. The charge on each bottom capacitor can be dumped very quickly (<20 microseconds), allowing the line scan to proceed through the whole image frame without delay to set the state of each pixel. The charge can be set by the analog voltage magnitude, the time at that voltage (bleed off), or a combination of the two. As the scan moves to the next line, electrically isolating $Vb_i$ for each display element with voltage $V_i$, and leaving each element with stored capacitive energy of $\frac{1}{2}\ CV_i^2$, the polar fluid continues to move towards the top channel until it has reduced it's contact area enough (C decreases) so that the effective voltage on the bottom plate increases. When the voltage on the two capacitors is equal, the fluid stops moving arriving at a steady state. At the end of the frame, the display circuitry addressed all rows to set Vb=Vc=Vt=0, eliminating the voltages from the display element and freezing the polar fluid in place. The resulting frame update speed is video rate (>20 frames per second). Because the update rate is so quick, the flicker from the global reset is barely noticeable.

In order to prevent charge build-up from impurities in the polar and non-polar fluids on either capacitor plate, the polarity of the drive scheme is switched on subsequent frames. Frame 2 would set Vt=−Hi and Vb between −Hi and 0. The use of Vt to drive the allows for Frame inversion.

An alternative embodiment to enable line inversion and dot inversion schemes is to employ a global reset: Vt=0, Vc=0, all row select lines=On, and Vb=+Hi for all outputs (or Vt=+Hi, Vc=+Hi and Vb=0), driving the polar fluid to the backside channel. Next, create the energetic condition in each pixel by setting Vt=0, Vc=+Hi, and Vb=0 for all display elements. The image is then updated by scanning each row with the select line, and by writing data to each row with the bank of column switching circuits. For a selected line, Vt=0, Vc=+Hi and Vb=+Hi to 0. The charge can be set by the analog voltage magnitude, the time at that voltage (bleed off), or a combination of the two. As the scan moves to the next line, electrically isolating $Vb_i$ for each display element with voltage $V_i$, and leaving each element with stored capacitive energy of ½ $CV_i^2$, the polar fluid continues to move towards the top channel until it has reduced it's contact area enough (C decreases) so that the effective voltage on the bottom plate increases. When the voltage on the two capacitors is equal, the fluid stops moving arriving at a steady state. At the end of the frame, the display circuitry addressed all rows to set Vb=Vc=Vt=0, eliminating the voltages from the display element and freezing the polar fluid in place. Since Vt=00 during for the entire scan, Vc and Vb can be switched to −Hi on a select line or column basis, allowing frame inversion, line inversion, or dot inversion.

Note that this dive scheme can be used for display elements that have isolated polar fluid bodies in each element, or for pixels with a connecting polar fluid element.

In another embodiment, partial areas can be updated without updating the entire screen, thereby reducing the flicker still further. To reset a fraction of the area, leave VT=Vc=0, and use the local TFTs to set Vb=HI, thereby driving the polar fluid to the back channel for those pixels only. Once complete, set Vb=0 on the next frame for all subpixels. Next, set Vc=VHi globally (or over a portion of the display if the Vc line is patterned into segments or lines. This creates the energetic condition necessary to move the fluid. It will not move the fluid in non-selected pixels because there is no difference in voltage between the viewer side and backside capacitors. Scan the TFTs in the write area between 0 and Hi to set the charge on the substrate capacitor. Finally, freeze the display element in place to display image with zero power (optional), with Vb=0, Vc=0, VT=0. This step removes all voltage in the system. The fluid is held in place by a balance of Laplace pressure. The entire TFT array is pulsed simultaneously to ground, not row-scanned, concurrent with Vc=0.

In another active matrix embodiment, the display apparatus circuitry contains a memory that retains the previous pixel state. Since the state of each display element is known, the circuitry computes the charge needed to move the display element from its current state to its new state only. The frame is divided into two subframes, a 'write white' and a 'write black' subframe. The frame time therefore doubles, decreasing update speed, but there is no erase frame to cause flicker. Even subframes reset pixels that need polar fluid in the lower channel to an appropriate bottom channel filled to the right pixel reset level. (VT=VC=0, Vb=0 to Hi). Vb is then set to zero globally to freeze the states. Odd subframes then pull fluid into the viewer side reservoir. Vc is set Hi globally, and Vb is driven from 0 to Hi to set the charge balance grayscale state. To mitigate grayscale error accumulation, grayscale resets such as Laplace barriers (i.e. rows of posts as described in WO2011020020) or rows of holes in electrodes may be included. These features allow the fluid to be driven to a known state closer to the desired state without having to be driven all the way back to a 100% switched state. This reduces visual observation by an observer of the pixel element. In the next step, the charge is removed from the switched pixels with a global Vt=Vc=Vb=0 to freeze the state.

Figure 9:
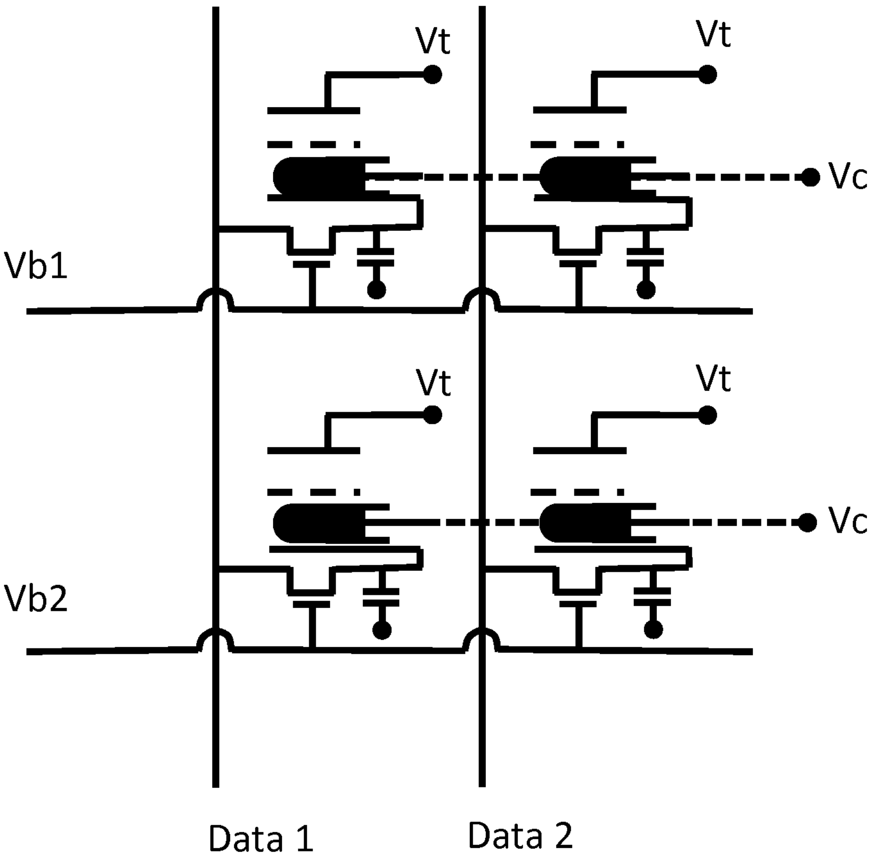
FIG. 9 is an active matrix drive scheme with a storage capacitor.

Referring to FIG. 9, an additional embodiment includes an additional storage capacitor in the display element circuit. This element adds to the capacitance of the substrate back side capacitor. With a storage capacitor of sufficient size, the charge balance can be set on the back side capacitor on each frame regardless of the starting pixel capacitance. If the transition time of the ink is not fast enough, the voltage may be written on multiple subsequent frames to bring the charge balance to the appropriate state. This technique is applicable to both cases where the polar fluid body is isolated between display elements, or connected between them.

Still another active matrix embodiment is constructed by connecting the TFT to the middle electrode or polar fluid (not shown in FIGS.), but similar to the passive matrix case. An optional storage capacitor may also be connected to the middle electrode. The topstrate electrode and bottom electrode are common to a large number of display elements—either a line or the whole display. The driving circuitry divides the frame into a 'charge scan subframe' and a 'write' subframe. First, set Vt=Vb (=+0, for example) globally. This will not move fluid because the capacitor voltages are balanced. Next, scan rows, sending voltages to each display element polar contact, which charges (or discharges) each set of capacitors in each display element. Once charges are placed in every pixel in the updated area, set Vt=0 and Vb=Hi globally (the write frame). The charge rebalances in the pixel, leading to the appropriate grayscale area coverage in the viewer channel. The update is fast with this method and produces no flicker. A further improvement can be made by employing a memory cell in the drive circuit to remember the position of the fluid in each display cell. In this way, the charge can be adapted quickly to the new state during the scan step. Furthermore, the speed can be increased still further by breaking the Vb connections into rows. A scan of the Vb voltage can then follow the row select scan by nominally 10 lines, thereby implementing the 'write' frame line by line during the scan, instead of using a global write frame. Finally, the display can be moved into bi-stable mode by discharging, such that Vt=Vb=Vc=0. This scheme applies to both polar fluid bodies that are isolated between display elements, and polar fluid bodies that are connected.

In order to prevent charge build-up from impurities in the polar and non-polar fluids on either capacitor plate, the polarity of the drive scheme is switched on subsequent frames, lines, or dots. Frame 2 would set Vc=−V and Vb to −Hi.

Figure 10:
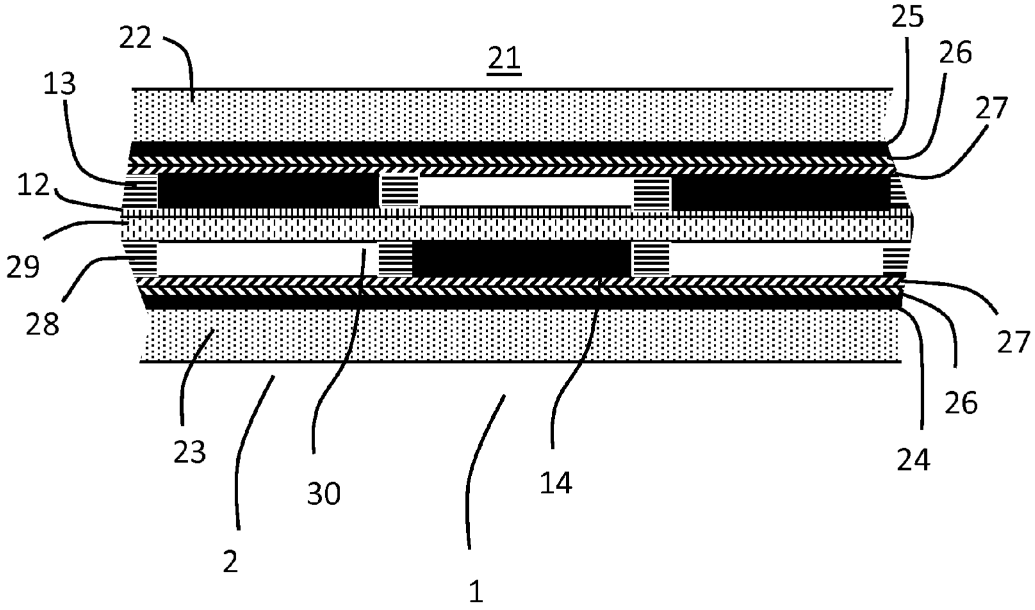
FIG. 10 is a second side view of the electrofluidic display element in FIGS. 1 and 2.
Figure 11:
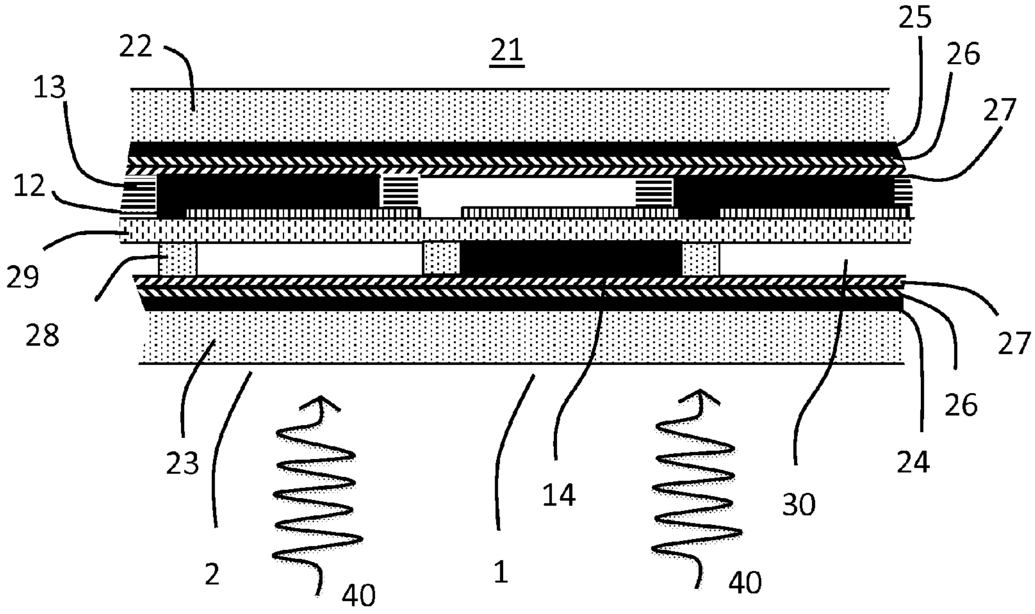
FIG. 11 is a transflective embodiment of a multi-stable electrofluidic device.

The area coverage of the ink viewer channel can also be used in a transflective display with the structure in FIG. 3. In FIG. 10, a view from the short pixel side in FIG. 3 is shown. As can be seen in FIG. 2, the ink advances linearly through the pixel with voltage actuation, covering the left and right sides of the side 20 equally. FIG. 11 shows a transflective display fabricated by offsetting the spacers on this side and by using a transparent conductor on part of the middle layer that sits over the top of the spacer. The spacers are transparent and let light from a light source shine through the display. Transposing the spacers laterally still maintains the multi-stable character of the display element because the channel heights are the same and hence the Young-Laplace pressure remains balanced in the absence of voltage. The viewer side and backside channels are simply offset. In this manner, the display can be switched from reflective to transmissive, and the display electronics can continue to provide exactly the same grayscale and switching information to run both transmissive and reflective modes. This is in contrast to reflective LCD, which can have a contrast inversion when switching modes. The driving circuitry now includes the backlight, and optionally, an external light sensor for turning on the backlight automatically. The same drive scheme runs both the transmissive and reflective modes and they can run concurrently.

In the above embodiments, a combination of driving schemes can be employed to reduce flicker further. The schemes that use a memory to switch pixels only the needed amount, but risk incorporating grayscale errors may at times, be driven with an erase frame to reset the grayscale.

Following from the above description and invention summaries, it should be apparent to those of ordinary skill in the art that, while the methods and apparatuses herein described constitute exemplary embodiments of the present invention, the invention is not limited to the foregoing and changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A display apparatus comprising:

a plurality of electrofluidic display elements, each element including:

a volume of a polar fluid, a volume of a non-polar fluid, a first substrate, a second substrate, a conductive film between the first and second substrates that is porous to both the polar fluid and the non-polar fluid, the conductive film arranged relative to the first substrate to define a first channel and a second channel, a first electrode layered with a first dielectric layer, arranged between the conductive film and the first substrate, the first electrode configured to receive a voltage and cause the polar fluid to occupy the first channel, a second electrode including a second dielectric layer, the second electrode arranged between the conductive film and the second substrate, the second electrode configured to receive a voltage and cause the polar fluid to occupy the second channel, a first capacitor comprising the first electrode, the first dielectric layer, and the conductive film, and a second capacitor comprising the second electrode, the second dielectric layer, and the conductive film; and, driving circuitry including a plurality of switching circuits in electrical communication with the plurality of electrofluidic display elements, where the plurality of switching circuits are configured to supply a switched voltage to the first capacitor and the second capacitor for each of the plurality of electrofluidic display elements, and where a difference in capacitor voltages is configured to change a coverage area of the polar fluid occupying the first channel.

2. The display apparatus of claim 1, wherein the difference in capacitor voltages is maintained for a fixed time by the driving circuitry to facilitate change in the coverage area of the polar fluid occupying the first channel.

3. The display apparatus of claim 1, wherein a degree of initial difference in capacitor voltages set by the driving circuitry controls an amount of change to the coverage area of the polar fluid occupying the first channel.

4. The display apparatus of claim 1, wherein a charge balance between the first capacitor and the second capacitor controls the coverage area of the polar fluid occupying the first channel.

5. The display apparatus of claim 1, wherein the driving circuitry changes polarity of the voltage bias on the first and second capacitors regularly.

6. The display apparatus of claim 1, wherein a display frame rendered on the plurality of electrofluidic display elements includes an update rate faster than 300 milliseconds.

7. The display apparatus of claim 1, wherein the polar fluid has a stable position in an absence of applied voltage into at least one of the first channel and the second channel.

8. The display apparatus of claim 1, wherein the plurality of electrofluidic display elements are arranged in a matrix of rows and columns, with the second capacitor connected to an output of a thin film transistor.

9. The display apparatus of claim 1, wherein each of the plurality of electrofluidic display elements is configured to be in electrical communication with a storage capacitor.

10. The display apparatus of claim 1, wherein the first capacitor and the second capacitor are configured to have no voltage difference therebetween during a passive matrix drive where non-select lines are biased.

11. The display apparatus of claim 1, wherein a steady state condition for the polar fluid occurs when the voltage on the first capacitor is equivalent to the voltage on the second capacitor.

12. The display apparatus of claim 1, wherein the driving circuitry further includes:

a first subframe comprising a high logic state and an accompanying voltage signal to a viewer side electrode and a polar connection electrode, and a selectable first subframe logic state and a selectable accompanying voltage to a backside electrode of each of the plurality of electrofluidic display elements in a display channel to be updated, thereby providing a condition to have the polar fluid occupy a backside channel; and, a second subframe comprising a low logic state and an accompanying voltage for the viewer side electrode, a high logic state and an accompanying voltage for the polar connection electrode, and a selectable second subframe logic state and a selectable accompanying voltage to the backside electrode of each of the plurality of electrofluidic display elements in the display channel to be updated, provided by scanning row electrodes to turn a row of transistors to an on state while sending each pixel on the row of transistors a selectable voltage signal through column electrodes, thereby providing a condition to have the polar fluid occupy a viewer side channel.

13. The display apparatus of claim 12, wherein the selectable first subframe logic state is common to each of the plurality of electrofluidic display elements during a frame.

14. The display apparatus of claim 12, wherein the selectable first subframe logic state is individually selected for each of the plurality of electrofluidic display elements by scanning the row of transistors during a frame.

15. The display apparatus of claim 12, wherein scanning the row electrodes to the on state while sending each pixel on the row a selectable voltage signal through the column electrodes includes providing an appropriate charge to at least one of the plurality of electrofluidic display elements to create a display state, and moving to a next scanned row prior to completion of a movement of the polar fluid to an equilibrium condition.

16. The display apparatus of claim 12, wherein the channel of the display to be updated is the entire display.

17. The display apparatus of claim 12, wherein a time to set a pixel charge state in the second subframe is less than 5 milliseconds, and more preferably less than 0.5 milliseconds.

18. The display apparatus of claim 12, wherein a polarity of logic signals and electrode voltages are alternated between display update frames.

19. The display apparatus of claim 12, wherein the channel of the display to be updated is a fraction of the display and wherein the said driving electronics provide a first subframe comprising a low logic state and accompanying voltage signal to the viewer side electrode and the polar connection electrode, and a selectable voltage logic state and accompanying voltage to all the display elements in the display channel to be updated, thereby providing a condition to move polar fluid into the backside channel, and a second subframe comprising a low logic state and accompanying voltage for the viewer side electrode, a high logic state and accompanying voltage for the polar connection electrode, and display element variable logic state to the backside electrode provided by scanning the row electrode to turn the row of transistors to the on state while sending each pixel on the row a selectable voltage signal through the column electrodes, thereby providing a condition to move polar fluid into the viewer side channel.

20. The display apparatus of claim 12, wherein reset states are included in the display apparatus, and the driving circuitry switches the polar fluid to a nearest reset state to a desired optical performance rather than a complete switching of the pixel.

21. A display apparatus, the apparatus comprising:

a plurality of electrofluidic display elements, each element including:

a volume of a polar fluid, a volume of a non-polar fluid, a first substrate, a second substrate, a conductive film between the first substrate and the second substrate that is porous to both the polar fluid and the non-polar fluid, the conductive film arranged relative to the first substrate to define a first channel occupied by at least one of the polar fluid and the non-polar fluid, a first electrode layered with a first dielectric layer, arranged between the conductive film and the first substrate, the first electrode configured to receive a voltage and cause the polar fluid to occupy the first channel, the conductive film arranged relative to the second substrate to define a second channel occupied by at least one of the polar fluid and the non-polar fluid, a second electrode layered with a second dielectric layer, arranged between the conductive film and the second substrate, the second electrode configured to receive a voltage and cause the polar fluid to occupy the second channel, a first capacitor comprising the first electrode, the first dielectric layer, and the conductive film, a second capacitor comprising the second electrode, the second dielectric layer, and the conductive film, a first spacer interposing the first electrode and the conductive film, a second spacer interposing the second electrode and the conductive film, wherein at least one of the first spacer and the second spacer is translucent and aligned with a translucent region of the conductive film; and, driving circuitry including a plurality of switching circuits in electrical communication with the first electrode, the second electrode, and a counter electrode, the driving circuitry configured to supply a switched voltage to the first capacitor and the second capacitor of a display element, where a difference in capacitor voltages changes a coverage area of the polar fluid occupying the first channel, and where the driving circuitry is in electrical communication with a light source located behind the first substrate, and where the switched voltages applied to the first capacitor and the second capacitor reposition the polar fluid within the first channel and the second channel and modify the transmitted light.

* * * * *